US012664019B2

(12) United States Patent
Waddington

(10) Patent No.:  US 12,664,019 B2
(45) Date of Patent:  Jun. 23, 2026

(54) IMPLEMENTING HETEROGENEOUS MEMORY WITHIN A PROGRAMMING ENVIRONMENT

(71) Applicant: International Business Machines Corporation, Armonk, NY (US)

(72) Inventor: Daniel Waddington, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 609 days.

(21) Appl. No.: 17/521,515

(22) Filed: Nov. 8, 2021

(65) Prior Publication Data

US 2023/0147878 A1    May 11, 2023

(51) Int. Cl.
G06F 9/50    (2006.01)
(52) U.S. Cl.
CPC .................................. G06F 9/5016 (2013.01)
(58) Field of Classification Search
CPC ...... G06F 9/5016; G06F 9/4488; G06F 9/466; G06F 8/315
See application file for complete search history.

(56) References Cited

U.S. PATENT DOCUMENTS

| 8,538,977 | B2 | 9/2013 | Lee et al. |
| 9,086,950 | B2 | 7/2015 | Assarpour |
| 9,298,605 | B1 * | 3/2016 | Hara .................. G06F 12/1441 |
| 9,530,006 | B2 | 12/2016 | Troeger et al. |

| 9,934,246 | B2 | 4/2018 | Raja et al. |
| 10,198,352 | B2 | 2/2019 | Subrahmanyam et al. |
| 10,216,637 | B2 | 2/2019 | Ergan et al. |
| 10,360,149 | B2 | 7/2019 | Marathe et al. |
| 10,802,984 | B2 | 10/2020 | Sanjeepan et al. |
| 10,817,421 | B2 | 10/2020 | Talagala et al. |

(Continued)

FOREIGN PATENT DOCUMENTS

| EP | 2024825 A2 | 2/2009 |
| WO | 2008017204 A1 | 2/2008 |

OTHER PUBLICATIONS

Khan et al., "MOSIQS: Persistent Memory Object Storage With Metadata Indexing and Querying for Scientific Computing," IEEE Access, vol. 9, Jun. 2021, pp. 85217-85231.

(Continued)

*Primary Examiner* — Pierre Vital
*Assistant Examiner* — Tuan M Nguyen
(74) *Attorney, Agent, or Firm* — Jeffrey Ingalls

(57) ABSTRACT

A computer-implemented method according to one embodiment includes creating a data abstraction that includes a set of memory resources and variables associated with the memory resources. The computer-implemented method also includes implementing the data abstraction within a programming language environment. A system according to another embodiment, includes a processor. The system also includes logic that is integrated with the processor, executable by the processor, or integrated with and executable by the processor. Moreover, the logic is configured to: create a data abstraction that includes a set of memory resources and variables associated with the memory resources. The logic is further configured to: implement the data abstraction within a programming language environment.

19 Claims, 10 Drawing Sheets

(56) References Cited

U.S. PATENT DOCUMENTS

| | | | | |
|---|---|---|---|---|
| 10,817,502 | B2 | 10/2020 | Talagala et al. | |
| 10,853,178 | B1 * | 12/2020 | Pan | G06F 11/3055 |
| 10,977,018 | B1 * | 4/2021 | Hwang | G06F 8/47 |
| 11,467,973 | B1 * | 10/2022 | Diamant | G06N 3/063 |
| 2006/0123046 | A1 | 6/2006 | Doise et al. | |
| 2010/0257511 | A1 * | 10/2010 | Hatabu | G06F 11/3636 |
| | | | | 717/131 |
| 2015/0066157 | A1 * | 3/2015 | Karypis | G06F 9/4843 |
| | | | | 700/3 |
| 2016/0124725 | A1 * | 5/2016 | Drach | G06F 11/3442 |
| | | | | 717/145 |
| 2017/0344475 | A1 * | 11/2017 | Subrahmanyam | G06F 9/4493 |
| 2019/0347211 | A1 | 11/2019 | Bortnikov et al. | |
| 2020/0143043 | A1 * | 5/2020 | Hong | G06F 21/566 |
| 2021/0019200 | A1 * | 1/2021 | Niles | G06F 9/4868 |
| 2021/0019206 | A1 * | 1/2021 | Niles | G06F 9/4868 |
| 2021/0019207 | A1 * | 1/2021 | Niles | G06F 9/4868 |
| 2022/0114025 | A1 * | 4/2022 | K | G06F 9/5016 |
| 2022/0229805 | A1 * | 7/2022 | Chakeres | G06F 11/2094 |

OTHER PUBLICATIONS

Memaripour et al., "Breeze: User-Level Access to Non-Volatile Main Memories for Legacy Software," IEEE 36th International Conference on Computer Design, 2018, pp. 413-422.

Ye et al., "Supporting Legacy Libraries on Non-Volatile Memory: A User-Transparent Approach," ACM/IEEE 48th Annual International Symposium on Computer Architecture (ISCA), 2021, pp. 443-455.

Hoseinzadeh et al., "Corundum: Statically-Enforced Persistent Memory Safety," Proceedings of the 26th ACM International Conference on Architectural Support for Programming Languages and Operating Systems (ASPLOS), Apr. 2021, pp. 429-442.

Waddington et al., "PyMM: Heterogeneous Memory Programming for Python Data Science," Woodstock, Jun. 2018, 7 pages.

Anonymous, "NIST Cloud Computing Program," NIST, Information Technology Laboratory, Nov. 13, 2013, pp. 1-2, retrieved from www.nist.gov/itl/cloud/.

Mell et al., "The NIST Definition of Cloud Computing," Version 15, Oct. 7, 2009, pp. 1-2.

Mell et al., "The NIST Definition of Cloud Computing," Recommendations of the National Institute of Standards and Technology, NIST Special Publication 800-145, Sep. 2011, pp. 1-7.

CSRC, "Cloud Computing," Computer Security Resource Center, Oct. 2017, 3 pages, retrieved from https://csrc.hist.gov/projects/cloud-computing.

pmem.io, "Persistent Memory Programming," pmem.io, 7 pages, retrieved on Oct. 29, 2021, from https://pmem.io/pmdk/.

PyNVM, "PyNVM: A Python Interface to PMDK," pynvm, 2016, 2 pages, retrieved from https://pynvm.readthedocs.io/en/v0.3.1/.

Apache, "Apache Arrow," The Apache Software Foundation, 2021, 2 pages, retrieved from https://arrow.apache.org/.

CXL, "Compute Express Link: The Breakthrough CPU-to-Device Interconnect," CXL, 2020, 3 pages, retrieved from https://www.computeexpresslink.org/.

Github, "The Python programming language," GitHub, 2021, 11 pages, retrieved from https://github.com/python/cpython.

Numpy, "The fundamental package for scientific computing with Python," NumPy, 2021, 3 pages, retrieved from https://numpy.org/.

Python, "Python/C API Reference Manual," Python Software Foundation, 2021, 3 pages, retrieved from https://docs.python.org/3/c-api/index.html.

Pytorch, "From Research to Production," PyTorch, 2021, 5 pages, retrieved on Oct. 29, 2021, from https://pytorch.org/.

TIOBE, "TIOBE Index for Oct. 2021," TIOBE Software BV, 2021, 7 pages, retrieved from http://tiobe.com/tiobe-index.

Rahm, E, "Logging and Recovery," Encyclopedia of Database Systems. Springer, 2009, 3 pages.

Waddington et al., "An Architecture for Memory Centric Active Storage (MCAS)," arXiv, May 2021, 17 pages.

Waddington et al., U.S. Appl. No. 16/866,234, filed May 4, 2020.

Graefe et al., "In-Memory Performance for Big Data," Proceedings of the VLDB Endowment, vol. 8, No. 1, 2014, pp. 37-48.

GitHub, "Memory Centric Active Storage," GitHub, Inc., 2020, 2 pages, retrieved from https://github.com/IBM/mcas.

IBM, "Heap Memory Manager," IBM Knowledge Center, 3 pages, retrieved from https://www.ibm.com/support/knowledgecenter/en/ssw_ibm_i_72/rtref/heap_memory_manager.htm on Mar. 5, 2020.

Wikipedia, "Memory management," Wikipedia, Feb. 2020, pp. 1-7, retrieved from https://en.wikipedia.org/wiki/Memory_management.

Wikipedia, "Redis," Wikipedia, Feb. 2020, pp. 1-6, retrieved from https://en.wikipedia.org/wiki/Redis.

Redis, "Introduction to Redis," Redis, 2 pages, retrieved from https://redis.io/topics/introduction on Mar. 5, 2020.

Berger et al., "Reconsidering Custom Memory Allocation," Proceedings of the 17th ACM SIGPLAN conference on Object-oriented programming, systems, languages, and applications, Nov. 2002, pp. 1-12.

Venkataraman et al., "Consistent and Durable Data Structures for Non-Volatile byte-Addressable Memory," USENIX Conference on File and Storage Technologies, Feb. 2011, pp. 1-15, retrieved from https://static.usenix.org/event/fast11/tech/full_papers/Venkataraman.pdf.

Yang et al., "NV-Tree: Reducing Consistency Cost for NVM-based Single Level Systems," Proceedings of the 13th USENIX Conference on File and Storage Technologies (FAST '15), Feb. 2015, pp. 167-181.

Oukid, et al., "FPTree: A Hybrid SCM-DRAM Persistent and Concurrent B-Tree for Storage Class Memory," SIGMOD 16, Jun. 2016, 16 pages.

Moraru, et al., "Consistent, Durable, and Safe Memory Management for Byte-addressable Non Volatile Main Memory," TRIOS' 13, Nov. 2013, 17 pages.

Bhandari, et al., "Makalu: Fast Recoverable Allocation of Non-volatile Memory," OOPSLA' 16, Nov. 2016, pp. 677-694.

Coburn et al., "NV-Heaps: Making Persistent Objects Fast and Safe with Next-Generation, Non-Volatile Memories," ASPLOS' 11, Mar. 2011, 13 pages.

Wikipedia, "Demand paging," Wikipedia, Feb. 2020, 2 pages, retrieved from https://en.wikipedia.org/wiki/Demand_paging.

Kemper et al., "Adaptable Pointer Swizzling Strategies in Object Bases: Design, Realization, and Quantitative Analysis," VLDB Journal, vol. 4, 1995, pp. 519-566.

Wilson et al., "Dynamic Storage Allocation: A Survey and Critical Review," University of Texas, Department of Computer Sciences, 1995, pp. 1-78, retrieved from https://users.cs.northwestern.edu/~pdinda/icsclass/doc/dsa.pdf.

Kim et al., "clfB-tree: Cacheline Friendly Persistent B-tree for NVRAM," ACM Transactions on Storage, vol. 14, No. 1, Feb. 2018, pp. 5:1-5:17.

* cited by examiner

<u>400</u>

Create a Data Abstraction that Includes a Set of Memory Resources and Variables Associated with the Memory Resources — 402

Implement the Data Abstraction Within a Programming Language Environment — 404

500

502

Program

504

Volatile Objects

Temporary
Construction
Objects

Non-Volatile
Objects

506

DRAM Volatile
Memory

Non-Volatile Memory

508

700

Key-Object Index — 702

Object Metadata — 704

Object Data — 706

IMPLEMENTING HETEROGENEOUS MEMORY WITHIN A PROGRAMMING ENVIRONMENT

BACKGROUND

The present invention relates to heterogeneous memory usage, and more particularly, this invention relates to facilitating the use of heterogeneous memory in a computing environment.

Persistent memory is a rapidly advancing memory technology that provides power-off retention as well as more flexibility, stability, performance, and capacity than other memories such as flash memory. However, current programming language environments do not account for the management of persistent memory in conjunction with other available memory types, and therefore computing devices implementing such programming language environments do not benefit from the performance and power-off retention that persistent memory offers.

BRIEF SUMMARY

A computer-implemented method according to one embodiment includes creating a data abstraction that includes a set of memory resources and variables associated with the memory resources; and implementing the data abstraction within a programming language environment.

According to another embodiment, a computer program product includes one or more computer readable storage media, and program instructions collectively stored on the one or more computer readable storage media, the program instructions including instructions configured to cause one or more processors to perform a method including creating, by the one or more processors, a data abstraction that includes a set of memory resources and variables associated with the memory resources; and implementing, by the one or more processors, the data abstraction within a programming language environment.

According to another embodiment, a system includes a processor; and logic integrated with the processor, executable by the processor, or integrated with and executable by the processor, where the logic is configured to create a data abstraction that includes a set of memory resources and variables associated with the memory resources; and implement the data abstraction within a programming language environment.

Other aspects and embodiments of the present invention will become apparent from the following detailed description, which, when taken in conjunction with the drawings, illustrate by way of example the principles of the invention.

DETAILED DESCRIPTION

Figure 1:
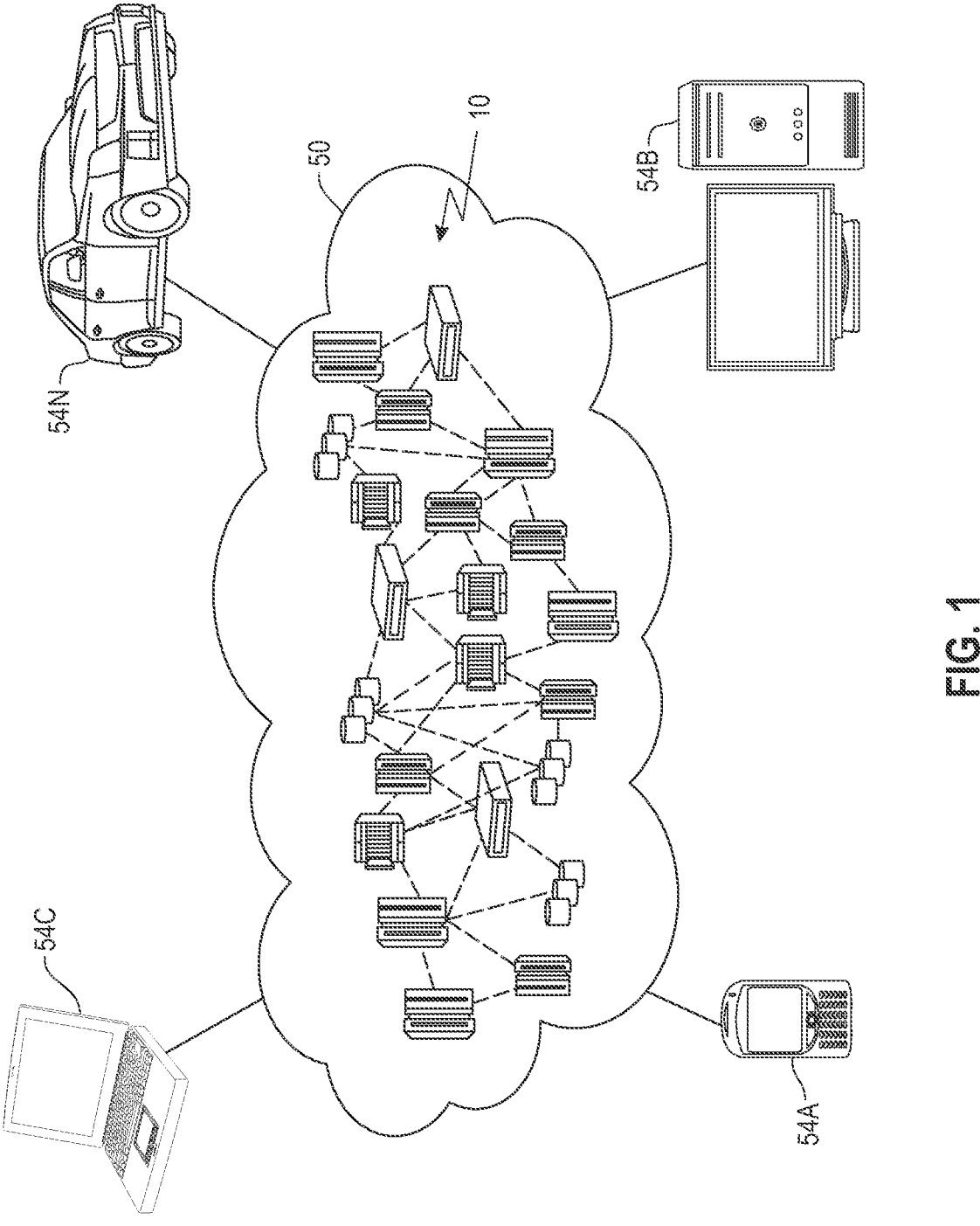
FIG. 1 depicts a cloud computing environment, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments of implementing heterogeneous memory within a programming environment.

In one general embodiment, a computer-implemented method includes creating a data abstraction that includes a set of memory resources and variables associated with the memory resources; and implementing the data abstraction within a programming language environment.

In another general embodiment, a computer program product includes one or more computer readable storage media, and program instructions collectively stored on the one or more computer readable storage media, the program instructions including instructions configured to cause one or more processors to perform a method including creating, by the one or more processors, a data abstraction that includes a set of memory resources and variables associated with the memory resources; and implementing, by the one or more processors, the data abstraction within a programming language environment.

In another general embodiment, a system includes a processor; and logic integrated with the processor, executable by the processor, or integrated with and executable by the processor, where the logic is configured to create a data abstraction that includes a set of memory resources and variables associated with the memory resources; and implement the data abstraction within a programming language environment.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
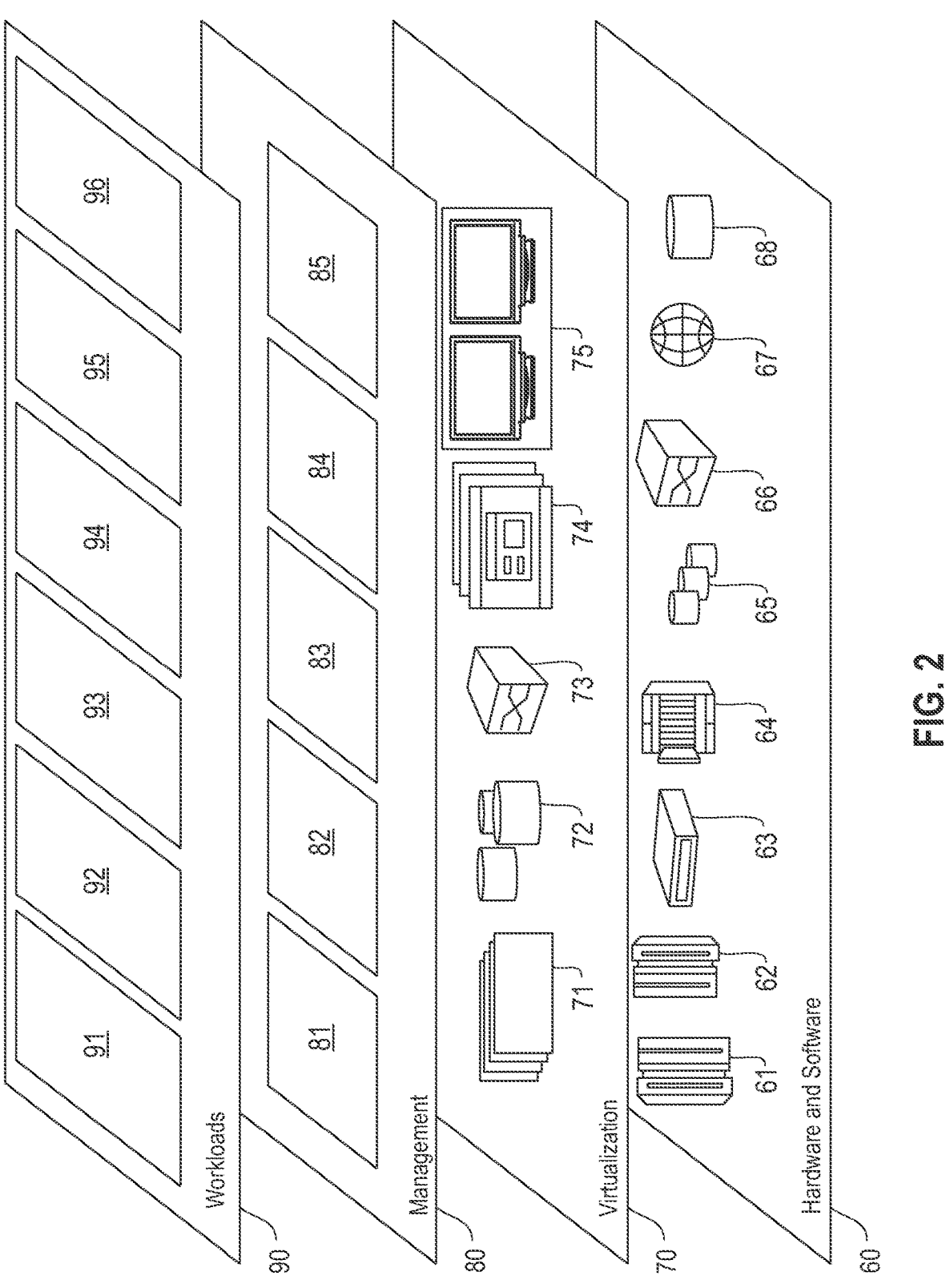
FIG. 2 depicts abstraction model layers, in accordance with one embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and implementing heterogeneous memory within a programming environment 96.

Figure 3:
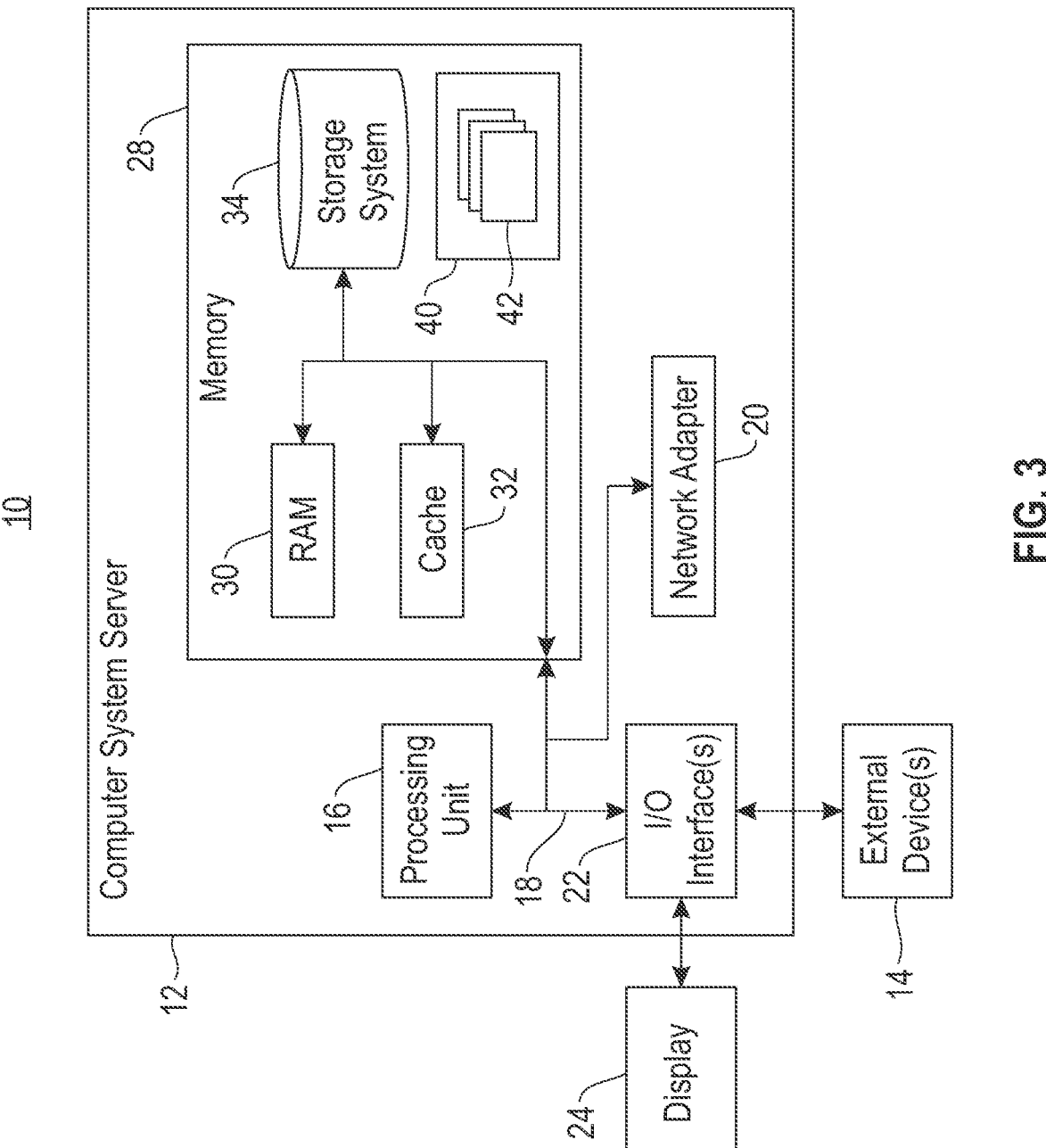
FIG. 3 depicts a cloud computing node, in accordance with one embodiment of the present invention.

Referring now to FIG. 3, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
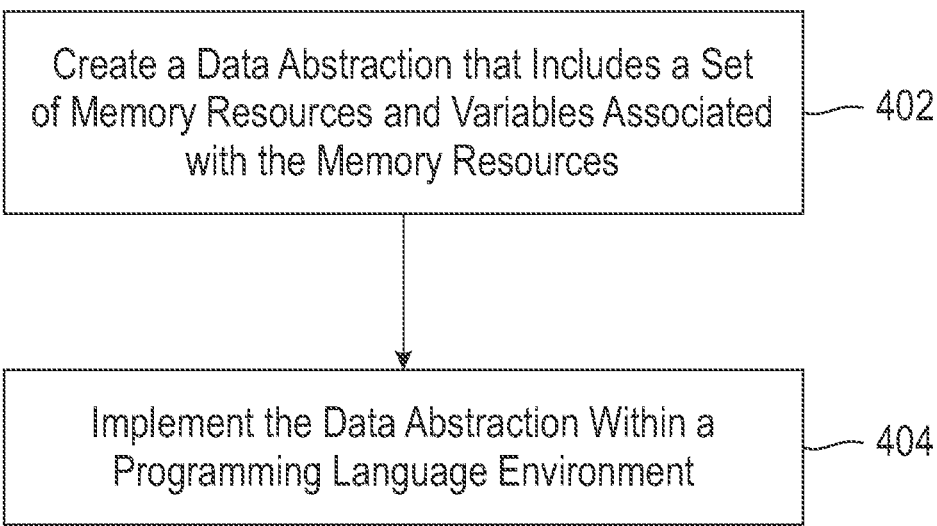
FIG. 4 illustrates a flowchart of a method for implementing heterogeneous memory within a programming environment, in accordance with one embodiment of the present invention.

Now referring to FIG. 4, a flowchart of a method 400 is shown according to one embodiment. The method 400 may be performed in accordance with the present invention in any of the environments depicted in FIGS. 1-3 and 5-10, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where a data abstraction is created that includes a set of memory resources and variables associated with the memory resources. In one embodiment, the variables for the data abstraction may use the memory resources allocated for the data abstraction that correspond to the variables. In another embodiment, for each variable within the data abstraction, data for each variable and metadata for each variable may be included within the data abstraction.

Additionally, in one embodiment, a particular instance of a data abstraction (e.g., a shelf, etc.) may be associated with a predetermined application. For example, a portion of memory resources and variables associated with the portion of memory resources may then be associated with the predetermined application. In another embodiment, the set of memory resources may include heterogeneous memory. For example, the set of memory resources may include persistent memory or other memory types.

Further, method 400 may proceed with operation 404, where the data abstraction is implemented within a programming language environment. In one embodiment, implementing the data abstraction within the programming language environment may include modifying the programming language environment to utilize the data abstraction (e.g., instead of one or more native memory resources and variables, etc.).

Further still, in one embodiment, one or more applications may then be created and/or implemented utilizing the modified programming language environment. In yet another embodiment, the one or more applications may utilize the memory resources and variables within the data abstraction instead of standard data variables and associated memory resources found within the programming language environment.

Also, in one embodiment, implementing the data abstraction within the programming language environment may include performing implicit type conversion within the data abstraction to utilize the data abstraction within the programming language environment. For example, a subclass of types within the data abstraction may be created that correspond to preexisting data types within preexisting libraries within the programming language environment.

In addition, in one example, in response to determining that a data abstraction variable is accessed, the type of the variable may be coerced/converted to match the preexisting data type. For instance, variable access may be determined utilizing one or more calls from a preexisting library within the programming language environment.

In this way, by using persistent memory within the data abstraction, data persistence may be provided to preexisting libraries within the programming language environment, without having to perform legacy preparation methods such as data pickling or program refactoring. This may improve a performance of computer systems implementing applications constructed utilizing the programming language environment that implements the data abstraction, as unnecessary legacy data storage/retrieval methods may be avoided.

Furthermore, in one embodiment, implementing the data abstraction within the programming language environment may include enabling shadow type instantiation within the programming language environment. For example, variables within the data abstraction instance that are implemented within the programming language environment may not be instantiated/constructed until an assignment of that variable, which results in writing to the assigned memory area, is performed. In another example, only parameters within the data abstraction instance which define a shape/type of data may be initially evaluated.

Further still, in one example, these parameters may be used to instantiate/create memory area within the allocated memory resources, without filling in any variables with actual data. In another example, preexisting constructor functions may still create volatile data types within the programming language environment. In yet another example, legacy manipulation functions may support shadow type instantiation within the programming language environment.

Also, in one embodiment, implementing the data abstraction within the programming language environment may include enabling crash-consistency within the programming language environment. For example, write modifications to variables within the data abstraction may be intercepted, and a hook may be utilized to provide one or more crash-consistency implementations (e.g., undo logging, redo logging, hardware logging, etc.) for the memory write modifications.

Additionally, in one example, crash-consistency may ensure that if a failure occurs during the performance of the write modification, either an instance of data before or after the write modification may be guaranteed. In another example, crash-consistency may also be implemented for multiple or all variables managed by the data abstraction.

In this way, additional data services may be implemented within the programming language environment via the data abstraction. These additional data services may improve a performance of a hardware system by decreasing a recovery of the system from a component failure and may eliminate corrupt data resulting from the component failure.

Further, in one embodiment, a portion of the persistent memory included within the data abstraction may be used as transient (short lived) memory. For example, a persistent memory partition may reserve a portion of the persistent memory for use as transient memory. In another example, backup page main memory may also be used as transient memory.

Further still, in one example, one or more expressions implemented within the programming language environment may require a predetermined amount of memory to be evaluated. In another example, when an expression that utilizes data abstraction variables is evaluated, a global allocator may be overridden, and transient memory may conditionally be used to evaluate the expression. In yet another example, an amount of memory needed to be allocated for an expression may be determined utilizing a global allocator.

Also, in one example, in response to determining that the amount of needed memory exceeds a predetermined size threshold, the global allocator may be overridden to use the portion of the persistent memory reserved for use as transient memory. In another example, the expression may then be evaluated in the portion of the persistent memory reserved for use as transient memory, and may then be copied into persistent memory.

In this way, by implementing the data abstraction within a programming language environment, heterogeneous memory sources (such as persistent memory) may be implemented within legacy applications created utilizing the programming language environment without having to rewrite the legacy applications. The use of heterogeneous memory sources such as persistent memory may improve a performance and stability of these legacy applications by providing features such as shadow type instantiation, crash-consistency, and increased transient memory availability (which were previously unavailable utilizing the programming language environment without the data abstraction). This in turn improves a performance of hardware systems implementing such legacy applications.

Programming Model for Persistent Memory

The invention addresses the problem of programming with persistent memory and managing heterogeneous memory environments that consist of volatile and non-volatile memories in the same system accessible by the same CPUs. More broadly, the invention presents an architecture for management of heterogeneous memories and program objects (variables) stored therein. The invention focuses on object oriented, dynamically typed, interpreted programming languages such Python and Java.

In one exemplary embodiment, programming language polymorphism and dynamic typing of existing programming languages (e.g., Python) may be leveraged to allow logical collections of program variable instances to reside in different types of memory-specifically volatile memory (DRAM) in combination with non-volatile (e.g., 3DXP Persistent Memory). The invention defines how memory is managed, how non-volatile instances are instantiated and how namespaces are managed. One aspect of the invention is based on an abstract representation, known as a shelf, that defines a collection of variable/object instances that correspond to a specific set of memory resources. The invention proposes how the shelf abstraction is implemented and used in an object-oriented programming environment. One advantage of this invention over existing state-of-the-art is that it can be used in conjunction with legacy libraries based on purely volatile objects.

Figure 5:
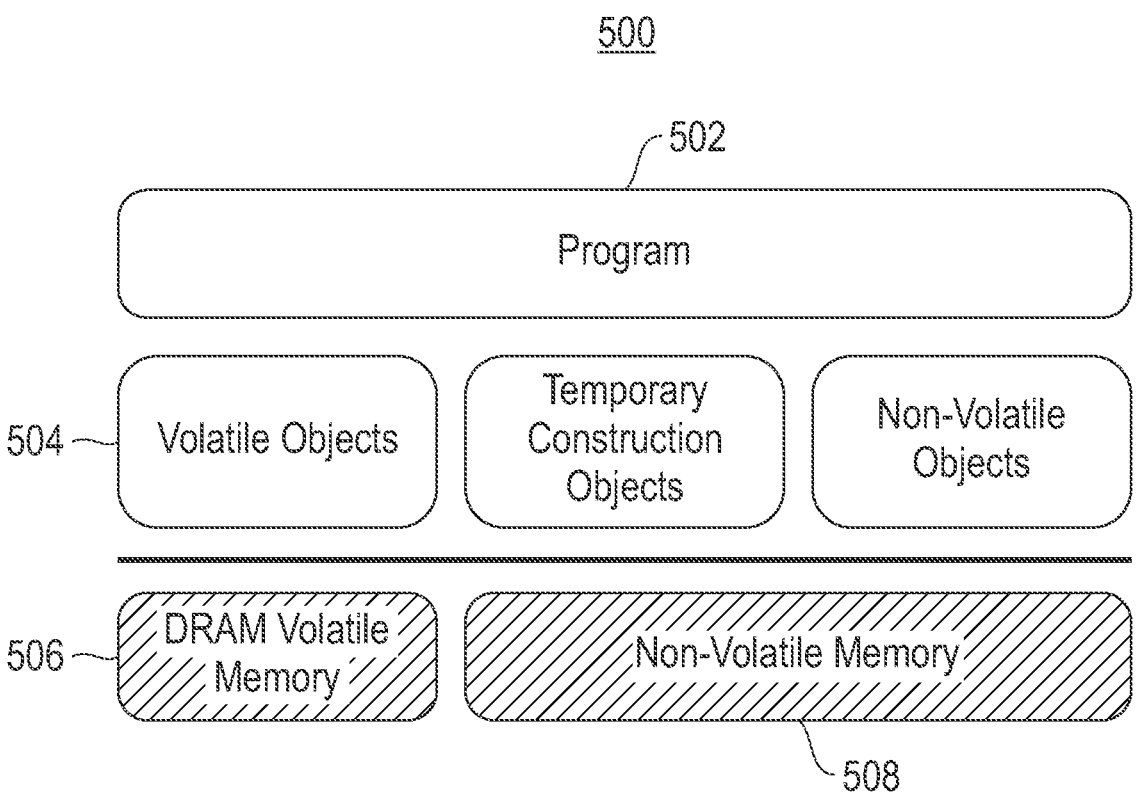
FIG. 5 illustrates an exemplary hardware environment, in accordance with one embodiment of the present invention.

FIG. 5 illustrates an exemplary hardware environment 500, according to one exemplary embodiment. As shown, an object-oriented program 502 has access to data in the form of objects 504. One exemplary programming language is the Python programming language. Conventionally, in systems without persistent memory, variables are stored in main system memory which uses DRAM hardware 506. The objects 504 are volatile and therefore their content is lost after program shutdown or system reset. In systems that provide persistent memory 508 (such as Intel Optane Persistent Memory), data can be stored for later retrieval. The data remains accessible even after the program exits or a system reset event occurs. Even without any power, the bit state is retained in persistent memory. Persistent memory 508 also may provide larger capacities than DRAM 506 and thus provides more memory capacity for "big-data" applications (or scale-up applications). However, storing objects in persistent memory requires additional effort. Variables should be accessible through some global namespace (system or application), type information should also be stored so that data elements that are restored can be typed appropriately, and they must be able to work with libraries and functions that operate on existing volatile objects 504.

Figure 6:
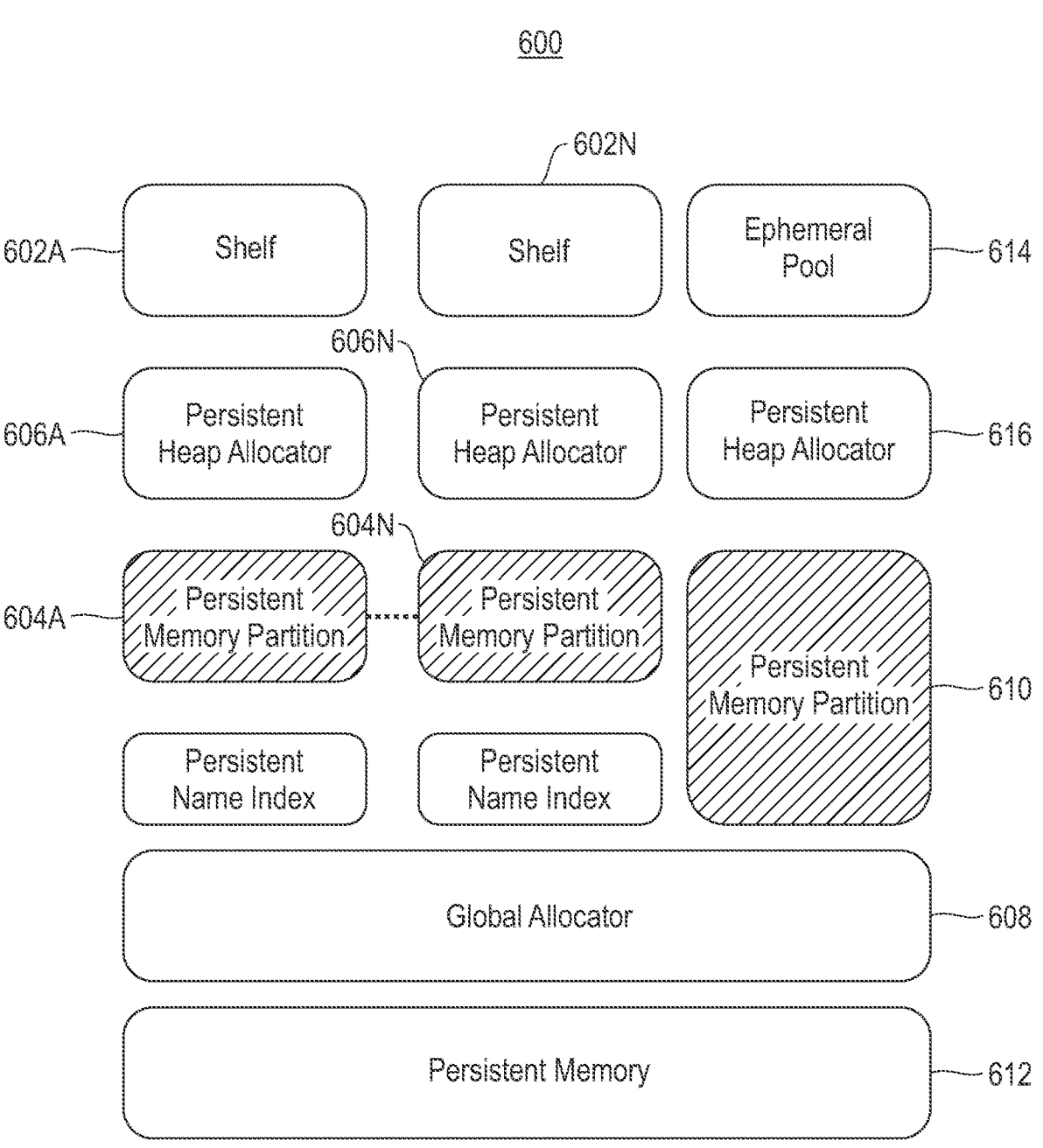
FIG. 6 illustrates an exemplary data abstraction architecture, in accordance with one embodiment of the present invention.

FIG. 6 illustrates an exemplary data abstraction architecture 600 according to one exemplary embodiment. One exemplary embodiment of the invention introduces a programming construct/type that represents a group of object instances that correspond to a specific set of memory resources. This is known as a shelf instance 602A-N. While shelf instances 602A-N are typically associated with persistent memory partitions 604A-N, they can also be used with other memory types (e.g., remotely attached memory). A partition consists of one or more regions of contiguous memory. Regions are allocated at a coarse granularity. Memory resources from each persistent memory partition 604A-N are managed by an independent heap allocator 606A-N that manages fine-grained, variable length, allocations. The heap allocator 606A-N is used by the shelf type to create and manage memory for objects residing on the shelf. This architecture ensures that all memory used by variable instances belonging to a specific shelf are derived from the same set of memory resources.

Each shelf is identified by a (string) name that when combined with the resource identify (e.g., memory device path) is globally unique at a system level. Typically, this is node-local, but could be extended to a distributed system. The shelf name is used by a program to get access to a specific shelf—it can be considered similar to a conventional filename.

In one embodiment, a global allocator 608 performs coarse-grained allocations of persistent memory partitions 604A-N for each shelf (data abstraction) instance 602A-N. Within each shelf instance 602A-N, the associated persistent memory partition 604A-N is managed by a persistent heap allocator 606A-N. In one embodiment, the persistent memory partitions 604A-N for each shelf instance 602A-N may be contiguous or non-contiguous.

Additionally, a predetermined partition 610 of the persistent memory 612 is allocated for use as an transient memory pool 614 (e.g., as short-lived volatile memory). This predetermined partition 610 is managed by an associated persistent heap allocator 616. In this way, a large portion of persistent memory may be used as volatile memory via the data abstraction architecture 600 instead of true volatile memory such as DRAM, etc.

Figure 7:
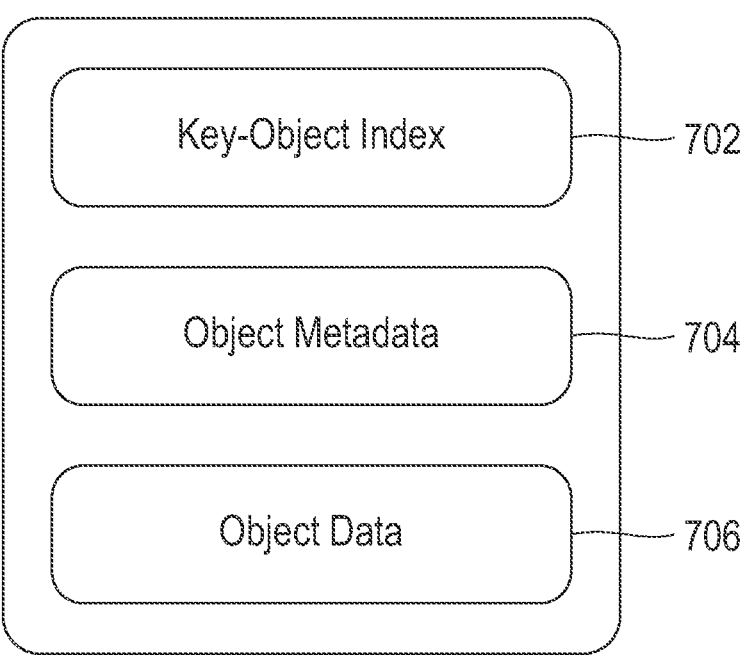
FIG. 7 illustrates an exemplary shelf (data abstraction) instance, in accordance with one embodiment of the present invention.

FIG. 7 illustrates an exemplary shelf (data abstraction) instance 700 according to one exemplary embodiment. A shelf instance 700 consists of three key elements: object-level key object index 702, object metadata 704 and object data 706. The (persistent) key object index 702 provides a naming between variable names and the associated object data. This name is the same that is used to access the variable from the program. For example, if the program opens shelf S which has variables X and Y (accessible as S.X and S.Y) then the key-object index 702 for shelf S will have entries for names X and Y (keys) that "point" to the corresponding data and metadata associated with the respective variable.

For example, the name X corresponds to the metadata in the KV store. In some cases, the value memory comes immediately after the metadata memory. Alternatively, a key derived from the variable name, e.g. X-value, is used to hold the value memory.

Object metadata 704 includes type information, version information and access control/security information. Object data 706 is the data that defines the concrete data (e.g., for a variable of type float, the object data is the 64-bits stored in IEEE standard representation). When a variable is added to a shelf, memory for both object metadata and data is allocated. Object metadata 704 and object data 706 are either allocated in contiguous memory or object metadata 704 includes a reference (e.g., pointer, offset, key name) to the object data 706.

Figure 8:
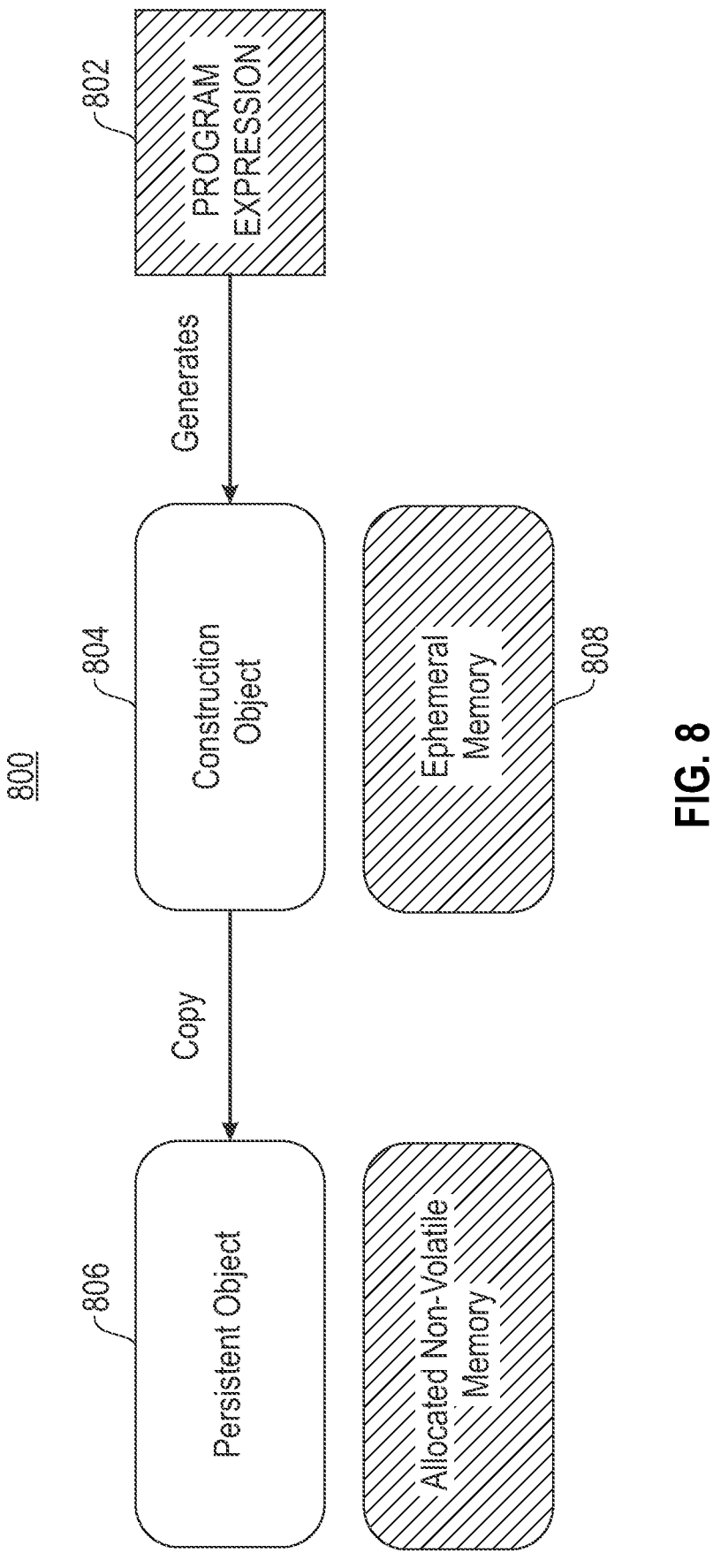
FIG. 8 illustrates an exemplary approach to creating objects on a shelf, in accordance with one embodiment of the present invention.

FIG. 8 illustrates an exemplary approach 800 to creating objects on a shelf, according to one exemplary embodiment. This approach may be based on a programming-level member assignment operations (e.g., s.x=<expression>) where the outer class instance is the shelf instance itself. The evaluated right hand side assignment expression 802 (either type constructor or library call) is used to create construction object 804 that can be used in a copy constructor for a persistent object 806.

The construction object 804 is instantiated in transient memory 808 (either system memory DRAM (if sufficient) or in non-volatile memory that is used transiently during the instantiation). The right-hand side of the assignment expression 802 is thus evaluated in transient memory 808 and then used to instantiate the persistent object 806. In the case of using persistent memory an additional partition is required for an transient memory pool.

In one embodiment of the invention (e.g., in the context of Python) the Python global allocator may be overridden so that all memory is allocated from persistent memory resources. This overload of the system allocator would direct memory allocations to the transient memory pool. As part of the invention, we propose that the size of the allocation be used to determine the location of the memory. That is, allocations above a certain threshold (e.g., 32 MB) are directed to persistent memory (as volatile), while smaller allocations are directed to the main memory. This approach is advantageous to scenarios where data structures are too large to fit in main memory and the capacity of persistent memory needs to be leveraged. To release memory from the "correct" allocator, a pre-defined address prefix/range can be used (i.e., if the address resides in a given range, then the memory is freed with allocator X).

Figure 9:
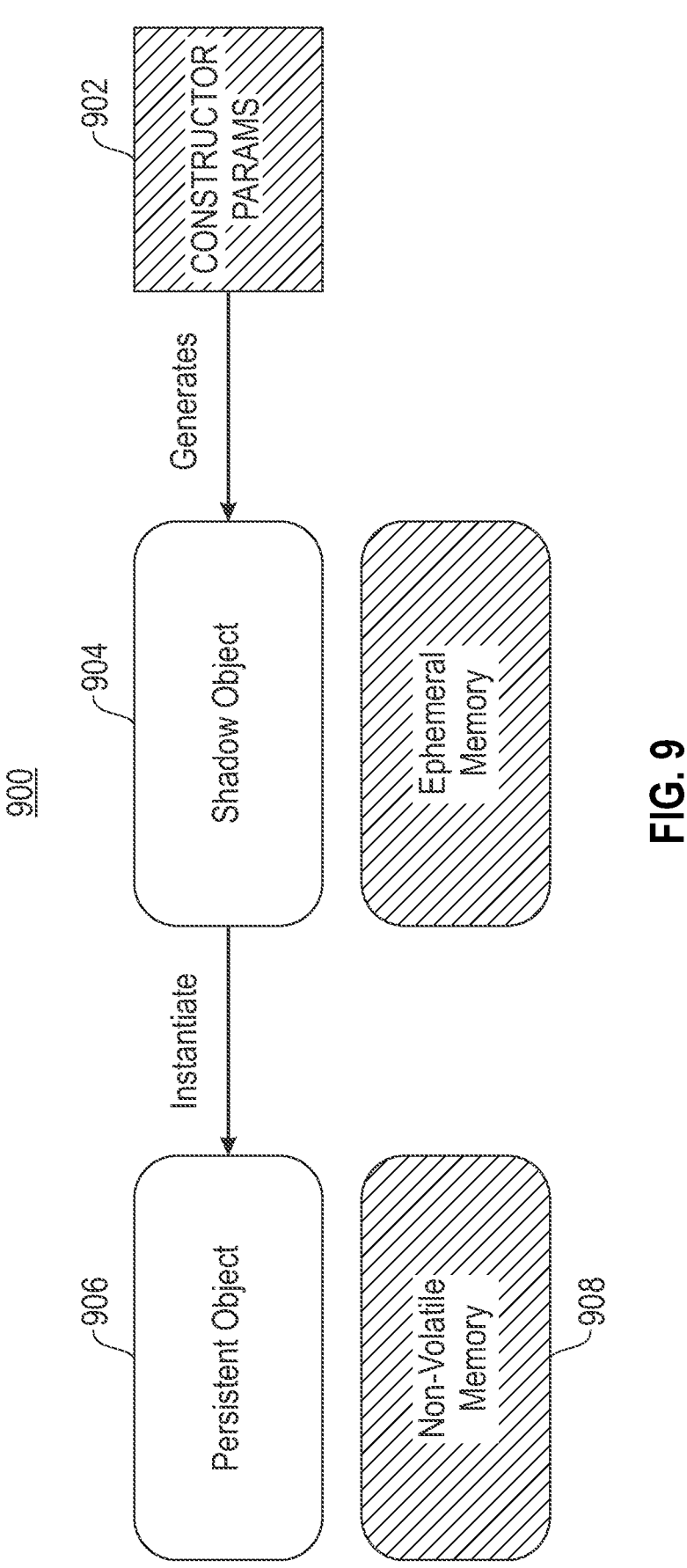
FIG. 9 illustrates an exemplary shadow typing implementation, in accordance with one embodiment of the present invention.

FIG. 9 illustrates an exemplary shadow typing implementation 900, according to an exemplary embodiment. As shown, to create object instances directly on a shelf, using a right-hand side constructor expressions (e.g., s.x=numpy.ndarray ((l00,100), dtype=int8), an alternative method, known as shadow typing, can be used. This is useful when a programmer wishes to create an instance of an object on the shelf (e.g., large matrix) without performing a copy or ownership transfer. In this method, the constructor parameters 902 and type are encapsulated in a shadow object instance 904. The shadow object instance 904 does not represent a concrete instance, but the necessary constructor values to later create the instance 906 in persistent memory 908 as a result of the assignment evaluation.

Because shelves may be based on persistent memory, shelf objects may be explicitly erased if they are no longer required (e.g. shelf.erase ('x') or shelf.erase (shelf.x) will release and free resources for variable 'x'.

In one embodiment, crash-consistency handling may be embedded in the shelf type implementation. This means that methods on shelved variable are implicitly crash consistent-dynamic programming languages allow this type of interception. The implementation of crash-consistent writes on shelved variables may be implemented utilizing an undo/redo log. Shelf types have hooks that can be used to demark transaction points and allow custom consistency services to be easily integrated.

In another embodiment, in order to use shelved objects with existing libraries they must have polymorphic counterparts. For example for an numpy.ndarray object, the shelved type which incorporates metadata etc. is interface compatible with its volatile counterpart numpy.ndarray. The following rules apply to type conversion between shelved type and volatile type.

1. Assignment to shelf S, S.x=y where both y is a shelved type, S.x remains shelved.
2. Assignment to shelf S, S.x=y where y is a volatile type, S.x. is a shelved type.
3. Assignment z=S.x where S.x is shelved type, z is reference to S.x.
4. Assignment z=T (S.x) where T is volatile type, S.x is shelf type, z is volatile type.
5. Assignment S.x=S.y will always make a copy (no persistent references).

In one embodiment, an abstract collection of variables may be used that reside on different types of memory in a system. In one embodiment, implicit type conversion may be used to convert non-volatile data types to volatile data types when being copied outside of the abstract collection of variables.

In another embodiment, subclassing and polymorphism may be used to allow legacy code to interact with variables stored on different memories with additional semantics and services (e.g., persistence and crash-consistency). In yet another embodiment, shadow types may be used to delay instantiation of a variable (evaluation of the right-hand side of the assignment statement) in the destination memory.

Also, in one embodiment, persistent memory may be optionally used as transient volatile memory for right-hand side of assignment statement evaluation. In another embodiment, the size of variable data (memory footprint) may be used to determine the type of memory to use. In yet another embodiment, matching of the address prefix or range may be performed to determine which allocator to release memory to.

Figure 10:
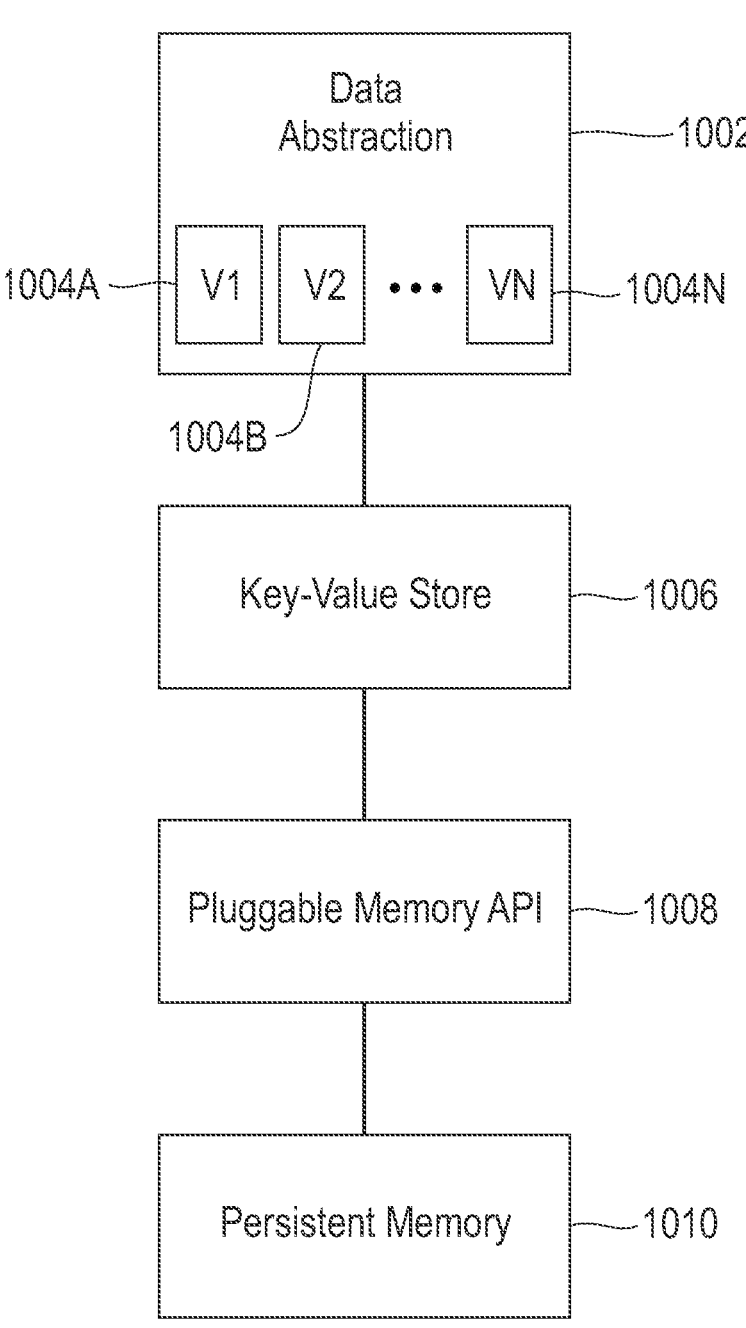
FIG. 10 illustrates an exemplary data abstraction environment, in accordance with one embodiment of the present invention.

FIG. 10 illustrates an exemplary data abstraction environment 1000 according to one exemplary embodiment. As shown, a data abstraction 1002 includes a logical set of variables 1004A-N, where each of the variables 1004A-N includes both stored data and metadata. The data abstraction 1002 is implemented utilizing a key-value store 1006, where a key may be derived from names of the variables 1004A-N.

Additionally, a pluggable memory API 1008 acts as a heap allocator associated with the persistent memory 1010. When space from the persistent memory 1010 is allocated for one or more variables 1004A-N within the data abstraction 1002, such allocation is implemented via the pluggable memory API 1008.

In this way, the use of persistent memory 1010 may enable the persistent storage of both metadata and data for instances of the data abstraction 1002. Heterogeneous Memory Programming for Python Data Science While persistent memory is a promising technology, leveraging it with legacy applications is non-trivial. This is primarily because legacy applications assume all memory is volatile and there is no notion of crash-consistency or state recovery. As new types of persistent and intelligent memory emerge, propelled by the CXL standard, the problem of integration and adoption remains. One embodiment of the present invention is provided as a framework for heterogeneous memory management in Python. It provides a means to abstract upon different memory types and their underlying traits (e.g., persistence, near/far). One embodiment of the present invention focuses on ease-of-use and employs an approach of sub-classing existing heavily-used types such as NumPy ndarray and PyTorch tensors. By doing so, one embodiment of the present invention allows new memory adoption with only minor modification to the application.

Design

One embodiment of the present invention is based around the concept of a shelf. A shelf represents a logical grouping of variable instances that are held in a specific set of memory resources. For persistent memory, shelves and their variables exist across program runs and machine resets. Variables can also exist outside of any shelf in "main memory", which is typically volatile DRAM directly attached to the local CPU.

Shelves may represent logical locations for program variables tied to specific memory. Each shelf is supported by independent namespace and memory management. Shelves abstract away the details of the underlying memory management (e.g., heap management), transactions (for persistence), configuration and other potential services specific to a given memory (e.g., encryption).

In one embodiment, references cannot be created on a shelf. However, references to shelved objects can be created in main memory. Assignments between variables on a shelf (e.g., shelf.x=shelf.y) are implicitly by-copy not by-reference. This approach simplifies reference management.

When a Python program opens a shelf, the variables are immediately available to the compute; there is no need for serialization or deserialization from storage, such as commonly done with Python "pickling".

Each shelf represents a single namespace. Thus, like-named variables can exist on different shelves. Shelf members can be either flat data structures (e.g. matrix) or dynamic data structures based on pointers (e.g. lists). Shelves are opened or created by instantiation of the shelf class. When the object reference count of s reaches zero, the shelf is closed. Instances of variables on a shelf, herein termed shelf members, are directly accessible through the attribute dot operator.

Shelf Types

Only variables of supported types can be placed on a shelf. This is because the implementation has to both manage memory associated with the type and also manage transactions in the case of persistent memory (other new types may also need additional intercept functions). It is expected that shelf types are created for different platforms and different types of memory although generalized persistent memory supporting types may be re-used assuming flushing behavior is the same.

To successfully integrate with existing libraries, these shelf types are interface-compatible with their non-shelf (main memory) counterparts. Shelf types typically use sub-classing to inherit methods from the non-shelf counterparts. Shelf types share a common base type. They are instantiated through the attribute assignment operator and they can only exist in the memory associated with a shelf-they cannot exist in main memory.

Shadow Types

The right-hand side of the assignment expression is either a shadow type or an instance of class T that inherits a supported shelf type that can be used for copy construction. Shadow types are used to delay evaluation of an expression (used as the right-hand side of an assignment statement), until execution of the assignment operation itself. Thus, they avoid the instantiation of potentially large objects before the assignment to the shelf is executed.

Each shadow type has a corresponding shelf type. Shadow type instances (held temporarily in main memory) carry a copy of any constructor parameters that are needed to later create an instance of the corresponding shelf type. Thus, shadow types are placeholders for delayed instantiation. Each shadow type provides methods that are used to create the corresponding shelf types either newly or reconstituted from persistent memory.

The key reason for shadow types is that they allow large data structures to be instantiated on the shelf without first making a copy in main memory. They allow the shelf to allocate memory prior to constructing the type. This is necessary when the capacity of the main memory is less than that of the shelf memory.

Under the hood, the assignment expression is overloaded. At point of invocation the right-hand side of the assignment expression is an instantiated shadow type. The implementation of the assignment statement allocates memory from resources associated with the shelf and then instantiates the shelf type directly therein and associates it with the name.

Alternative to using shadow types, one embodiment of the present invention also allows the right-hand side of the expression to be a class that is sub-classed by a shelf type.

Persistent Memory Support

One exemplary aim of one embodiment of the present invention is to make using persistent memory much easier for the programmer. While other frameworks fundamentally require re-writing the application and explicitly managing software transactions, one embodiment of the present invention aims to minimize impact to the application. As previously discussed, allowing persistent memory use with existing libraries is of great practical importance.

Metadata

To provide a program access to variables and data that have been stored in, persistent memory requires that variable name and type information is also stored in persistent memory. As previously discussed, shelves and shelf members are given string-based name that can be used to "find" them and re-instantiate on recovery or start-up.

Type information is stored in some predefined format. All shelf members must support an agreed metadata header that can be examined to determine the type and check version information when a shelf is re-opened. Value data can be stored in contiguous memory with the metadata header or in a different region of memory associated through pointers/offset or an additional entry in the namespace index.

Having a common data format provides the consistency needed to allow a shelf to effectively recovery variables and their corresponding types.

Persistent Memory Transactions

Effective use of persistent memory means providing the ability to achieve crash-consistency typically through write transactions. That is, for each data structure in persistent memory that provide modify or update operations (i.e. that write to memory), the system should ensure that "transactions" either complete in entirety or not at all. That is, if a power-fail or other reset event occurs, the system either winds writes back (undo) or re-applies the writes (redo) to ensure a consistent point can be recovered.

To improve usability, what constitutes a transaction should be apparent and obvious to the programmer. In one exemplary implementation, transactions are implicitly defined as all public methods of an object. In one embodiment of the present invention, transaction support for persistent memory is realized through wrappers that get called when shelf member methods that write to memory are called.

In addition to direct access, one embodiment of the present invention wraps transaction begin and end calls around public methods that are known to write to memory. The implementation of these calls can be easily modified to whatever transaction supports is available.

One embodiment of the present invention includes a new Python programming library designed for the management and use of heterogeneous memory. It abstracts the association of data structures to a specific memory type such as DRAM, persistent memory and future CXL-based attached memories (volatile or not). It does not prescribe how to achieve crash-consistency for persistent memory, but rather provides sufficient hooks to implement whatever strategy is desired.

In one embodiment, a programming model is provided for persistent memory leverage programming language polymorphism and dynamic typing of existing programming languages (e.g., Python) to allow logical collections of program variable instances in different types of memory-specifically volatile memory (DRAM) in combination with non-volatile memory (e.g., 3DXP Persistent Memory). The model may include:

An abstract collection of variables that reside on different types of memory in a system.

Implicit type conversion to convert non-volatile data types to volatile data types when being copied outside of the abstract collection of variables.

Subclassing and polymorphism to allow legacy code to interact with variables stored on different memories with additional semantics and services (e.g., persistence and crash-consistency).

Shadow types to delay instantiation of a variable (evaluation of the right-hand side of the assignment statement) in the destination memory.

Optional use of persistent memory as transient volatile memory for right-hand side of assignment statement evaluation).

Use of a size of variable data (memory footprint) to determine the type of memory to use.

Matching of the address prefix to determine which allocator to release memory to.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement embodiments of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
creating a data abstraction that includes a set of memory resources and variables associated with the memory resources, wherein the memory resources include persistent memory and transient memory, wherein a portion of the persistent memory is configured to function as transient memory;
implementing the data abstraction within a programming language environment; and
creating an object in the data abstraction by:
determining whether a size of the object is above a predetermined threshold, and
creating a construction object in the portion of the persistent memory configured as transient memory in response to determining the size of the object is above the predetermined threshold,
wherein a remaining portion of the persistent memory is divided into partitions,
wherein the partitions of the persistent memory correspond to respective object instances,
wherein the partitions of the persistent memory are managed by independent heap allocators,
wherein the independent heap allocators are configured to implement fine-grained and/or variable length allocations in the respective partitions of the persistent memory,
wherein data and metadata corresponding to the respective variables are included in the data abstraction,
wherein implementing the data abstraction within the programming language environment includes:
performing implicit type conversion within the data abstraction to utilize the data abstraction within the programming language environment, and
enabling shadow type instantiation within the programming language environment, and
wherein creating a second object in the data abstraction includes:
creating a shadow object instance in the transient memory, and
using constructor values in the shadow object instance to create the second object in the persistent memory.

2. The computer-implemented method of claim 1, comprising in response to determining that an amount of needed memory exceeds a predetermined size threshold, overriding a global allocator to use the portion of the persistent memory for use as transient memory, wherein the global allocator performs coarse-grained allocations of the persistent memory for shelf instances, wherein portions of the persistent memory which correspond to the shelf instances are managed by respective persistent heap allocators.

3. The computer-implemented method of claim 1, wherein data and metadata corresponding to the respective variables are included in the data abstraction, wherein creating the object in the data abstraction includes: creating the construction object in the transient memory in response to determining the size of the object is below the predetermined threshold.

4. The computer-implemented method of claim 1, wherein the portion of persistent memory in the data abstraction configured as transient memory is managed by an associated persistent heap allocator, wherein the object is created in the data abstraction using the persistent heap allocator.

5. The computer-implemented method of claim 1, wherein implementing the data abstraction within the programming language environment includes performing implicit type conversion within the data abstraction to utilize the data abstraction within the programming language environment.

6. The computer-implemented method of claim 1, wherein implementing the data abstraction within the programming language environment includes enabling shadow type instantiation within the programming language environment.

7. The computer-implemented method of claim 1, wherein implementing the data abstraction within the programming language environment includes enabling crash-consistency within the programming language environment.

8. A computer program product comprising at least one computer readable storage medium, and program instructions collectively stored on the at least one computer readable storage medium, the program instructions comprising instructions configured to cause one or more processors to perform a method comprising:

creating, by the one or more processors, a data abstraction that includes a set of memory resources and variables associated with the set of memory resources, wherein the set of memory resources includes persistent memory and transient memory, wherein a portion of the persistent memory is configured to function as transient memory;

implementing, by the one or more processors, the data abstraction within a programming language environment; and creating an object in the data abstraction by:

determining whether a size of the object is above a predetermined threshold, and creating a construction object in the portion of the persistent memory configured as transient memory in response to determining the size of the object is above the predetermined threshold, wherein a remaining portion of the persistent memory is divided into partitions, wherein the partitions of the persistent memory correspond to respective object instances, wherein the partitions of the persistent memory are managed by independent heap allocators, wherein the independent heap allocators are configured to implement fine-grained and/or variable length allocations in the respective partitions of the persistent memory, wherein data and metadata corresponding to the respective variables are included in the data abstraction, wherein implementing the data abstraction within the programming language environment includes:

performing implicit type conversion within the data abstraction to utilize the data abstraction within the programming language environment, and enabling shadow type instantiation within the programming language environment, and wherein creating a second object in the data abstraction includes:

creating a shadow object instance in the transient memory, and using constructor values in the shadow object instance to create the second object in the persistent memory.

9. The computer program product of claim 8, wherein data and metadata corresponding to the respective variables are included in and managed by the data abstraction.

10. The computer program product of claim 8, wherein the method further comprises:

in response to determining that an amount of memory associated with evaluating an expression exceeds a predetermined threshold, overriding a global allocator of the data abstraction, wherein the global allocator performs coarse-grained allocations of the persistent memory for shelf instances; and in response to overriding the global allocator, using the portion of the persistent memory as transient memory to evaluate the expression, wherein a remaining portion of the persistent memory is divided into partitions, wherein the partitions of the persistent memory are managed by independent heap allocators.

11. The computer program product of claim 8, wherein implementing the data abstraction within the programming language environment includes performing implicit type conversion within the data abstraction to utilize the data abstraction within the programming language environment.

12. The computer program product of claim 8, wherein implementing the data abstraction within the programming language environment includes enabling shadow type instantiation within the programming language environment.

13. The computer program product of claim 8, wherein implementing the data abstraction within the programming language environment includes enabling crash-consistency within the programming language environment.

14. The computer program product of claim 8, wherein a portion of persistent memory included in the data abstraction is configured to function as transient memory.

15. The computer program product of claim 8, wherein the portion of persistent memory in the data abstraction configured to function as transient memory is managed by an associated persistent heap allocator.

16. A system, comprising:

a processor; and logic integrated with the processor, executable by the processor, or integrated with and executable by the processor, the logic being configured to:

create a data abstraction that includes a set of memory resources and variables associated with the memory resources, wherein the set of memory resources includes persistent memory and transient memory, wherein a portion of the persistent memory is configured to function as transient memory;

implement the data abstraction within a programming language environment; and create an object in the data abstraction by:

determining whether a size of the object is above a predetermined threshold, and creating a construction object in the portion of the persistent memory configured as transient memory in response to determining the size of the object is above the predetermined threshold, wherein a remaining portion of the persistent memory is divided into partitions, wherein the partitions of the persistent memory correspond to respective object instances, wherein the partitions of the persistent memory are managed by independent heap allocators, wherein the independent heap allocators are configured to implement fine-grained and/or variable length allocations in the respective partitions of the persistent memory, wherein data and metadata corresponding to the respective variables are included in the data abstraction, wherein implementing the data abstraction within the programming language environment includes:

performing implicit type conversion within the data abstraction to utilize the data abstraction within the programming language environment, and enabling shadow type instantiation within the programming language environment, and wherein creating a second object in the data abstraction includes:

creating a shadow object instance in the transient memory, and using constructor values in the shadow object instance to create the second object in the persistent memory.

17. The system of claim 16, wherein data and metadata are included in the data abstraction.

18. The system of claim 16, wherein implementing the data abstraction within the programming language environment includes performing implicit type conversion within the data abstraction to utilize the data abstraction within the programming language environment.

19. The system of claim 16, wherein the logic is further configured to:

in response to determining that an amount of memory associated with evaluating an expression exceeds a predetermined threshold, overriding a global allocator of the data abstraction, wherein the global allocator performs coarse-grained allocations of the persistent memory for shelf instances, wherein portions of the persistent memory which correspond to the shelf instances are managed by respective persistent heap allocators; and in response to overriding the global allocator, using the portion of the persistent memory as transient memory to evaluate the expression.

* * * * *